United States Patent
Keite-Telgenbüscher et al.

(10) Patent No.: US 11,926,769 B2
(45) Date of Patent: Mar. 12, 2024

(54) STORAGE-STABLE, REACTIVE, PRESSURE-SENSITIVE ADHESIVE TAPE

(71) Applicant: tesa SE, Norderstedt (DE)

(72) Inventors: Klaus Keite-Telgenbüscher, Hamburg (DE); Frank Hannemann, Hamburg (DE); Claudia Moehrke, Hamburg (DE); Stefan Kramp, Hamburg (DE)

(73) Assignee: tesa SE, Norderstedt (DE)

( * ) Notice: Subject to any disclaimer, the term of this patent is extended or adjusted under 35 U.S.C. 154(b) by 180 days.

(21) Appl. No.: 17/362,006

(22) Filed: Jun. 29, 2021

(65) Prior Publication Data

US 2021/0403767 A1 Dec. 30, 2021

(30) Foreign Application Priority Data

Jun. 29, 2020 (DE) .............. 10 2020 208 059.3

(51) Int. Cl.
| | |
|---|---|
| *C09J 7/10* | (2018.01) |
| *C08K 5/00* | (2006.01) |
| *C08K 5/10* | (2006.01) |
| *C08K 5/14* | (2006.01) |
| *C08K 5/1515* | (2006.01) |
| *C08K 5/16* | (2006.01) |
| *C09J 7/38* | (2018.01) |
| *C09J 11/06* | (2006.01) |
| *C09J 175/06* | (2006.01) |

(52) U.S. Cl.
CPC .............. *C09J 7/38* (2018.01); *C08K 5/0025* (2013.01); *C08K 5/10* (2013.01); *C08K 5/14* (2013.01); *C08K 5/1515* (2013.01); *C08K 5/16* (2013.01); *C09J 7/10* (2018.01); *C09J 11/06* (2013.01); *C09J 175/06* (2013.01); *C09J 2301/208* (2020.08); *C09J 2301/302* (2020.08); *C09J 2301/312* (2020.08); *C09J 2301/408* (2020.08); *C09J 2433/00* (2013.01); *C09J 2475/00* (2013.01)

(58) Field of Classification Search
None
See application file for complete search history.

(56) References Cited

U.S. PATENT DOCUMENTS

| | | | |
|---|---|---|---|
| 3,018,262 A | 1/1962 | Schroeder | |
| 3,117,099 A | 1/1964 | Proops et al. | |
| 6,908,722 B2 | 6/2005 | Ebata et al. | |
| 2008/0113184 A1 | 5/2008 | Yoshida et al. | |
| 2013/0212968 A1 | 8/2013 | Demmig et al. | |
| 2016/0046775 A1 | 2/2016 | Mai et al. | |
| 2016/0168426 A1 | 6/2016 | Yamashita et al. | |
| 2018/0215955 A1* | 8/2018 | Claret | ............ C09J 4/06 |

FOREIGN PATENT DOCUMENTS

| | | |
|---|---|---|
| CN | 101200623 A | 6/2008 |
| CN | 103910879 A | 7/2014 |
| CN | 108884363 A | 11/2018 |
| CN | 108976380 A | 12/2018 |
| CN | 112262190 A | 1/2021 |
| DE | 102013222739 A1 | 12/2014 |
| DE | 102015217860 A1 | 11/2016 |
| DE | 102015009764 A1 | 2/2017 |
| DE | 102017220861 A1 | 5/2019 |
| DE | 102018206632 A1 | 10/2019 |
| DE | 102018216868 A1 | 4/2020 |
| EP | 3091059 A1 | 11/2016 |
| GB | 2582919 A | 10/2020 |
| WO | 2014202402 A1 | 12/2014 |
| WO | 2015062809 A1 | 5/2015 |
| WO | 2015150251 A1 | 10/2015 |
| WO | 2017021085 A1 | 2/2017 |
| WO | 2017102282 A1 | 6/2017 |
| WO | 2017174303 A1 | 10/2017 |
| WO | 2017186528 A1 | 11/2017 |
| WO | 2018104053 A1 | 6/2018 |
| WO | 2019101728 A1 | 5/2019 |
| WO | 2019207125 A1 | 10/2019 |

OTHER PUBLICATIONS

European Patent Office, European Search Report, European Patent Application No. 21177037.5, dated Mar. 23, 2022, 3 pages.
China National Intellectual Property Administration, First Office Action, Chinese Patent Application No. 202110590123.5, dated Nov. 23, 2022, 3 pages.

(Continued)

*Primary Examiner* — Frank D Ducheneaux
(74) *Attorney, Agent, or Firm* — Price Heneveld LLP

(57) ABSTRACT

A reactive PSA film that includes: (a) a polymeric film former matrix; (b) one or more reactive components; and (c) a reagent selected from an initiator, a curing agent and an activator. The component (b) is present at a mass fraction of ≥30%, as based on the sum of (a), (b) and (c). Further, ≥50 wt % of the film former matrix is a crystallizable polymer which: (i) exhibits a crystallization enthalpy of <1 J/g in a DSC measurement on cooling at 10K/min from at least 30K above a peak temperature of the melting peak of the polymer or ≥100° C., whichever is greater; and (ii) exhibits a crystallite fusion enthalpy of ≥15 mJ/mg in its pure state in a first heating curve of a DSC measurement at 10K/min and after storage for ≥one month from 15 to 25° C. and relative humidity from 30 to 70%.

20 Claims, No Drawings

(56) References Cited

OTHER PUBLICATIONS

China National Intellectual Property Administration, Search Report, Chinese Patent Application No. 202110590123.5, dated Nov. 16, 2022, 2 pages.
German Patent Office, German Office Action, German Patent Application No. 10 2020 208 059.3, dated Jan. 21, 2021, 2 pages.
Habenicht, Gerd, "Gerd: Gluing—Basics, Tehnologies, Applications," 2009, 6th edition, Chapters 3 and 4, p. I-XXVI and pp. 169-294, Springer, Heidelberg, Germany.
Donatas Satas, Handbook of Pressure Sensitive Adhesive Technology, 1999, 609-631, 3rd. Ed., Satas & Associates, Warwick, Rhode Island, U.S.A. (12 pages).
Korea Intellectual Property Office, Request for the Submission of an Opinion for Korea Patent Application No. 20210074853, dated Aug. 29, 2022, 5 pages.
Korea Intellectual Property Office, Written Opinion and Amendment for Korea Patent Application No. 20210074853, dated Oct. 21, 2022, 21 pages.
Korea Intellectual Property Office, Written Decision on Registration for Korea Patent Application No. 20210074853, dated Mar. 7, 2023, 6 pages.

* cited by examiner

STORAGE-STABLE, REACTIVE, PRESSURE-SENSITIVE ADHESIVE TAPE

CROSS-REFERENCE TO RELATED APPLICATIONS

This application claims the benefit of priority under 35 U.S.C. § 119 of German Patent Application No. 10 2020 208 059.3, entitled STORAGE-STABLE, REACTIVE, PRESSURE-SENSITIVE ADHESIVE TAPE, filed Jun. 29, 2020, the contents of which are relied upon and incorporated herein by reference in their entirety.

FIELD OF THE DISCLOSURE

The present disclosure relates to a curable pressure-sensitive adhesive film comprising (a) a polymeric film former matrix, (b) one or more reactive components and (c) a reagent selected from an initiator, especially a radical initiator, or an activator or a catalyst. The invention further relates to a multi-component film system comprising two or more of the aforesaid films, in which some of the films comprise an initiator and some other of the films comprise an activator, a catalyst or accelerator.

BACKGROUND OF THE DISCLOSURE

Reactive pressure-sensitive adhesive tapes which cure at room temperature, based for example on the polymerization of acrylate monomers or epoxy resins, have been developed for a number of years and have attained a high level of maturity. A substantial problem, however, is the storage stability of the uncured adhesive tapes. This storage is to take place likewise at room temperature.

Reactive pressure-sensitive adhesives (PSAs) and adhesive tapes which are produced from them are described in a range of texts in the prior art. These texts entail the approach of bringing known liquid adhesive systems into film form and presenting them in that form, by incorporating a reactive component—based, for instance, on acrylic monomers or epoxide compounds—into a matrix film, and doing so in the presence of initiators, activators and/or accelerators which, however, in the storage state of these films do not as yet trigger a reaction. The reaction—for instance, a polymerization and/or curing—of the reactive component may be set in motion by external influences—such as, for instance, by heat, moisture, plasma, radiation and so on—or else, for example, by directly contacting two films of the aforesaid kind with one another, one of them receiving an initiator and the other an activator, with the initiator being activated only by the activator. The result is a two-component adhesive system in film form.

Accordingly, for instance, two-component adhesive systems based on acrylic monomers in the form of pressure-sensitive adhesive films (adhesive tapes) are described in WO 2014 202402 A, WO 2015 062809 A, WO2018 104053 A and WO 2019 101728 A. WO 2017 174303 A and WO 2017 186528 A show epoxy-based reactive systems for adhesive film systems of this kind.

The texts WO 2015 150251 A and WO 2017 021085 A disclose adhesive films which are activated by plasma exposure. Conversely, WO 2017 102282 presents an adhesive film which comprises a laser-ablatable layer. By removal of this layer using a laser, reagents can be contacted and a curing reaction set in motion.

Many of the reactive pressure-sensitive adhesive tapes produced according to the prior art, however, exhibit a distinct decrease in the tack of the uncured adhesive tape, and in the technical adhesive performance achieved after curing, after just a few weeks. This tack—or touch stickiness—is the capacity of the adhesive, after having been contacted with a substrate, of attaching to said substrate directly and without increased pressing pressure. Technical adhesive performance embraces properties such as the bond strength after the adhesive has flowed onto the substrate and after any curing has taken place.

Reactive pressure-sensitive adhesive tapes are frequently composed of a polymer matrix—which is usually inert in the curing reaction though may also be provided with reactive groups—which may take the form of a self-supporting film and is therefore also termed a film former matrix, and of reactive compounds distributed therein, which in the presence of initiators, activators, catalysts or the like can be brought to a curing reaction, allowing a network of the reactive compounds to develop within or with the matrix film.

Film former matrices used in the prior art include both amorphous and crystallizable polymers. Examples of amorphous polymers used are ethylene-vinyl acetate copolymers having a vinyl acetate fraction of more than 55% (e.g. Levamelt 700 from Arlanxeo), acrylonitrile copolymers (such as nitrile-butadiene rubber (NBR), polyvinyl butyral (e.g. Mowital from Kuraray), poly(vinylidene chloride-co-acrylonitrile)) or phenoxy resins (e.g. PKHA from InChemRez). Crystallizable polymers used are frequently polyurethanes with a high crystallization rate that are known from the hotmelt adhesive segment (e.g. Desmomelt 530 from Covestro). The skilled person prefers to use fast-crystallizing polymers for film adhesives, especially hotmelt adhesive formulations, since the resultant solidification time can be short. Such polymers are accordingly characterized by the manufacturers themselves in terms of their crystallization rate. For crystallization polyurethane hotmelt adhesives, for example, the great majority of the grades available on the market are characterized in stages of "rapid", "very rapid" or "extremely rapid" crystallization.

It is therefore an object of the invention to provide a room temperature-curing, reactive, pressure-sensitive adhesive tape, based in particular on the polymerization of acrylate monomers, which unites a long storage stability—especially at room temperature (23° C.) or in the region of room temperature—with a high technical adhesive performance.

SUMMARY OF THE DISCLOSURE

According to a first aspect of the disclosure, a reactive pressure-sensitive adhesive film is provided that includes: (a) a polymeric film former matrix; (b) one or more reactive components; and (c) a reagent selected from an initiator, a curing agent and an activator. The (b) one or more reactive components is present at a mass fraction of at least 30%, as based on the sum of (a), (b) and (c). Further, at least 50 wt % of the polymeric film former matrix is a crystallizable polymer which: (i) exhibits a crystallization enthalpy of less than 1 J/g in a differential scanning calorimetry (DSC) measurement, as measured on cooling at a rate of 10 K/min from a starting temperature which is at least 30 K above a peak temperature of the melting peak of the crystallizable polymer or at least 100° C., whichever starting temperature is greater; and (ii) exhibits a crystallite fusion enthalpy of at least 15 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

According to a second aspect of the disclosure, a reactive pressure-sensitive adhesive film is provided that includes: (a) a polymeric film former matrix; (b) one or more reactive components; and (c) a reagent selected from an initiator, a curing agent and an activator. The (b) one or more reactive components is present at a mass fraction of at least 30%, as based on the sum of (a), (b) and (c). Further, at least 50 wt % of the polymeric film former matrix is a crystallizable polymer that is a polyurethane which: (i) exhibits a crystallization enthalpy of less than 1 J/g in a differential scanning calorimetry (DSC) measurement, as measured on cooling at a rate of 10 K/min from a starting temperature which is at least 30 K above a peak temperature of the melting peak of the matrix and crystallizable polymer or at least 100° C., whichever starting temperature is greater; and (ii) exhibits a crystallite fusion enthalpy of at least 15 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

According to another aspect of the disclosure, an adhesive film system is provided that includes at least two reactive pressure-sensitive adhesive films according to the first aspect and in contact with one another. The first pressure-sensitive adhesive film according to the first aspect is further configured such that the reagent is a radical initiator. In addition, the second pressure-sensitive adhesive film according to the first aspect is further configured such that the reagent is an activator or an accelerator.

DETAILED DESCRIPTION OF THE DISCLOSURE

The object is achieved by means of a reactive pressure-sensitive adhesive film comprising:
(a) a polymeric film former matrix,
(b) one or more reactive component or components in a mass fraction of at least 30 wt %, based on the sum of the components (a), (b) and (c), and
(c) at least one reagent selected from an initiator, especially a radical initiator, or a curing agent or an activator,
characterized in that the polymeric film former matrix is a crystallizable polymer having a very low crystallization rate.

The pressure-sensitive adhesive (PSA) film (PSA film) is a reactive PSA film. A characteristic of reactive PSA films is that the reaction which leads to curing and which ultimately brings about the high bond strengths takes place essentially only during use, in particular after application of the adhesive film. They contrast, for example, with crosslinked PSAs, whose crosslinking reaction for increasing cohesion takes place essentially prior to use, meaning that the film used for bonding is already crosslinked. It is not alien to the concept of a "reactive PSA film" for—possibly partial—crosslinking to have already taken place before application, provided that the essential curing reaction proceeds as described above.

In a preferred procedure, component (b), namely the one or more reactive components, is present in a mass fraction of more than 35 wt %. More preferably component (b) is present in a mass fraction of less than 70 wt %.

Reactive components in the sense of the invention are compounds which have functional groups that render them suitable—especially in the presence of the initiators, curing agents and/or activators—for a build-up reaction, especially a crosslinking reaction, leading to curing of the adhesive film. Such a reaction implies a substantial increase in the cohesion of the film through to the point of volume curing, more particularly such that a thermoset layer is formed in the fully cured product. The curing reaction may proceed essentially via a single reactive component or else via two or possibly even more different reactive components reacting with one another. Interpenetrating networks may also be built up here.

Initiators, in line with the general chemical usage of the term, are compounds which are added to a reaction mixture in order to enable and to initiate the desired reaction; initiators are usually themselves consumed (by decomposition, for instance).

Curing agents are compounds—usually monomeric or short-chain compounds—which, particularly where oligomeric compounds and/or reactive resins—such as, for example, epoxy resins—are employed, undergo reaction with them and take part in the curing reaction; they are of the kind known, for example, as a second component, alongside the reactive compound, in a curing reaction in the case of liquid two-component systems.

In the present text, the term "curing agent" also encompasses crosslinkers, which contribute accordingly to the build-up of a network from the reactive components—for instance, as bridge-forming components between the reactive compounds or between oligomer or polymer units formed from said components.

As used herein, "activators" are compounds which are used if the reaction to be performed does not take place, or does not take place sufficiently (sufficiently quickly), on its own. They are, more particularly, compounds which actually enable or accelerate the polymerization process. Activators are generally retained as the activated reaction proceeds, and are therefore not consumed. In chemical usage, different terms with overlapping meanings are frequently employed for such compounds. Such examples include "catalysts" and "accelerators".

As used herein, "catalysts" are substances which, usually even at very low concentrations, increase the reaction rate by lowering the activation energy of the chemical reaction, in particular without themselves being significantly consumed. As also used herein, "accelerators" are likewise substances whose presence can raise the reaction rate of a reactive system, but possibly with complete or partial consumption of the accelerator as well.

In the context of the present text, the effect of the initiator, curing agent and/or activator pertains in each case to the curing reaction of the adhesive film that is brought about by means of the reactive component or components. Reactive components and initiators, curing agents and accelerators, the latter three in each case in accordance with their presence, are also referred to collectively in the context of this text as a "reactive system".

Crystallizable polymer with very low crystallization rate means that the polymer used as polymeric film former matrix is a crystallizable polymer which on cooling starting from a temperature which is at least 30 K above the peak temperature of the melting peak but is at least 100° C. exhibits a crystallization enthalpy of less than 1 J/g in differential scanning calorimetry (DSC) at a cooling rate of 10 K/min. Further, the peak temperature is regarded as being the extreme point of the peak.

A crystallizable polymer in the sense of this text is a polymer which in the pure state has a crystallite fusion enthalpy of at least 15 mJ/mg, preferably of 25 mJ/mg, in the first heating curve of the DSC measurement at a heating rate of 10 K/min. A higher crystallinity contributes to improved handling properties of the film. More preferably, the crystallite fusion enthalpy is not more than 50 mJ/mg, since at higher crystallinity the storage stability drops and it is more difficult to maintain the pressure-sensitive nature of the reactive film. This measurement is made after a storage time of at least 1 month and under ambient conditions, especially at room temperature, in order to enable the polymer to enter into a defined initial state through possible post-crystallization prior to measurement. 'Ambient conditions' in this context are understood to be temperatures in the range from 15 to 30° C. and a relative humidity in the range from 30 to 70%. Corresponding crystallizable polymers having a very low crystallization rate are also identified in the context of this text as 'crystallizable polymers selected according to the invention'.

Reactive PSA films whose curing reaction can be initiated in the range from 15 to 30° C. are also referred to as room temperature-curing PSA films or room-temperature-curing reactive PSA films. The critical point is that the curing reaction is initiated, or activated, by appropriate triggering—such as, for instance, by the influence of high-energy radiation or by contacting with other chemicals. Not critical is whether the entire actual curing reaction proceeds within this range, also in particular in the case of simultaneous or subsequent exposure to a higher temperature. Such further heating, in the case of plasma activation or UV activation, for instance, is not unusual. The additional temperature increase may indeed allow the reaction rate to be increased, but is not necessary to initiate the reaction.

A great advantage in accordance with the invention is that the PSA film is a room temperature-curing reactive PSA film. The invention also embraces PSA films with a curing reaction for which an externally supplied agent is necessary for initiating and/or for implementing the curing, as in the case of moisture curing, for example. In one advantageous variant of the invention, the curing can be initiated not only at a temperature of less than 30° C., in particular in the temperature range from 15 to 30° C., but can also be carried out fully therein up to the desired degree of curing.

The adhesive films of the present invention, produced with the polymeric film former matrix used, possess pressure-sensitive adhesive properties in the uncured state, and in the uncured state have peel adhesions in accordance with the above characterization of pressure-sensitive adhesiveness; the adhesive films of the invention are therefore pressure-sensitively adhesive. Adhesives and also adhesive films produced from them that are said to be "pressure-sensitively adhesive" or are preceded by 'pressure-sensitive' are adhesives and films which even under a relatively weak applied pressure allow a durable bond to be made to the substrate and which can be detached again from the substrate after use with substantially no residue. In the sense of the present invention, a pressure-sensitive adhesive film possesses a peel adhesion in the uncured state of at least 1 N/cm. The peel adhesion in this context is determined on polycarbonate (Makrolon GP 099, 3 mm thickness, roughness as specified in the standard) in analogy to ISO 29862:2007 (Method 3) at 23° C. and 50% relative humidity, at a removal rate of 300 mm/min and a removal angle of 180°. A reinforcing sheet is used in the form of an etched PET sheet 36 µm thick, as available from Coveme (Italy). A measuring strip 2 cm wide is bonded by means of a roller machine at 4 kg and a temperature of 23° C. The adhesive film is removed immediately after application. The measured value (in N/cm) is obtained as the mean value from three individual measurements.

Pressure-sensitive adhesives (PSAs) are permanently pressure-sensitive adhesive at room temperature, thus having a sufficiently low viscosity and a high tack, so that they wet the surface of the respective adhesive face even under low applied pressure. The bondability of the adhesives derives from their adhesive properties, and the re-detachability from their cohesive properties.

The pressure-sensitive adhesiveness of the PSA films of the invention may therefore in principle result from the fact that the polymeric film-former matrix itself has inherent pressure-sensitive adhesive properties. Generally speaking, however, this is not the case, meaning that the polymer or polymers used for the polymeric film former matrix have little or no pressure-sensitive adhesiveness. In that case the pressure-sensitive adhesiveness of the PSA films of the invention results typically from the admixing of the reactive component or components (b) used in the invention, in the amounts stated in accordance with the invention.

As observed above, however, the pressure-sensitive adhesiveness of the reactive film is more difficult to maintain when crystallinity is relatively high. In certain cases, therefore, it may be necessary or advantageous to admix tackifier resins additionally in order to improve the pressure-sensitive adhesive properties of the adhesive films. Pressure-sensitive adhesive properties can be controlled correspondingly by the incorporation of tackifier resins; such admixing, however, is only optional and not mandatory for the present invention. Further details of tackifier resins follow later on below.

Surprisingly it has emerged that in the formulation of a reactive PSA film of the invention it was possible to achieve a significantly improved storage stability for the film. When crystallizable polymers with a high crystallization rate were used, there was a reduction in tack after just a few days; with amorphous film-former polymers, significant detractions from the technical adhesive performance or from the handling qualities of the film were experienced.

Polymeric Film Former Matrix (a)

The adhesive film of the invention comprises a polymeric film former matrix (a), which forms the total fraction of polymeric film formers in the PSA film. It comprises at least one crystallizable polymer having a very low crystallization rate (crystallizable polymer selected according to the invention). The polymeric film former matrix may comprise further crystallizable polymers selected according to the invention, and/or further polymers not meeting the definition for crystallizable polymers selected according to the invention. Where the polymeric film former matrix comprises two or more polymers, the proportion of crystallizable polymers selected according to the invention in the polymeric film former matrix is preferably at least 50 wt %, and more preferably this matrix is composed exclusively of crystallizable polymers selected according to the invention.

With particular preference the polymeric film former matrix is formed by a single crystallizable polymer selected according to the invention, or by two crystallizable polymers selected according to the invention.

One function of the polymeric film former matrix is to provide a framework for the reactive component or components and any further constituents—such as tackifier resins—such that they are incorporated in a film or a sheet composed of the film-forming polymer or polymers. For this purpose, the corresponding reactive component or components and any further constituents are distributed—in particular, homogeneously—in the matrix.

A polymer is a chemical compound which consists of generally organic chain molecules or branched molecules (macromolecule) and is synthesized (polymerization) from identical, similar or different units (referred to as the monomers). At its most simple, the macromolecule consists only of one kind of monomer, being then referred to as a homopolymer. Copolymers are synthesized from different monomers, which in the macromolecule may be randomly distributed, regularly distributed or present in blocks. A monomer unit in the sense of this definition is the bound form of a monomer in a polymer. For the purposes of this text, the term "polymer" refers both to homopolymers and to copolymers.

Polymers with film former matrix suitability possess a weight-average molecular weight Mw of at least 5000 g/mol or more, preferably of at least 10000 g/mol or more.

Figures for weight-average and number-average molar masses (Mw and Mn, respectively) within this text refer to the determination by means of gel permeation chromatography (GPC). The eluent used was THF (tetrahydrofuran) with 0.1 vol % of trifluoroacetic acid. Measurement took place at 25° C. The pre-column used was PSS-SDV, 5μ, $10^3$Å, ID 8.0 mm×50 mm. Separation took place using the columns PSS-SDV, 5μ, $10^3$Å and also 105 Å and 106 Å, each of ID 8.0 mm×300 mm. The sample concentration was 4 g/l, the flow rate 1.0 ml per minute. Measurement was made against polystyrene standards (commercially available ReadyCal-Kit Poly(styrene) high from PSS Polymer Standard Service GmbH, Mainz); this was followed by universal conversion to a poly(methyl methacrylate) calibration using the Mark-Houwink coefficients a and K.

Crystallizable polymers which can be used advantageously in the invention, in the sense of the polymeric film former matrix (a), in pure form at room temperature (defined as 23° C.), are present wholly or partly in the form of crystalline domains, meaning that they are not completely amorphous.

The presence of crystalline domains can be ascertained by means of DSC measurements, through determination, for example, of the fusion enthalpy of the crystallites. When (semi-)crystalline polymers are melted, the conversion of the solid crystalline structures into an amorphous liquid (melt) state requires an expenditure of additional energy, recognizable through an endothermic enthalpy change. The process extends over a more or less relatively large temperature range. The first crystals to melt are those which are smaller or have a less regular construction. As the temperature goes up, increasingly thicker and larger crystallites then melt, until the entire sample has melted. The fusion enthalpy (energy required to melt the crystals) can be measured by means of differential scanning calorimetry (DSC).

Semicrystalline polymers (also referred to as semicrystalline plastics) possess not only a glass transition temperature TG, below which the amorphous phase becomes frozen, but also a melting temperature, at which the crystalline phase breaks down. The melting temperature provides a distinct separation between the entropy-elastic range and the flow range. In contrast to this, amorphous polymers (also referred to as amorphous plastics) have only a melting temperature, which is determined by the glass transition temperature. Commercial semicrystalline plastics typically possess a crystalline fraction of 20% to 80%.

The skilled person is able readily to distinguish the crystallite melting point from the glass transition range of an amorphous polymer. Generally speaking, for a semicrystalline polymer, there is a glass transition range below the crystallite melting temperature, often also below room temperature.

Accordingly, as defined at the outset, the at least one crystallizable polymer selected according to the invention is a polymer which in the pure state after defined storage—at least one month under ambient conditions—exhibits a crystallite fusion enthalpy of at least 15 J/g in the first heating curve of the DSC measurement at a heating rate of 10 K/min. In general, the defined storage conditions are already met in the supplying of a commercially available polymer from the manufacturer.

As defined at the outset, the at least one crystallizable polymer selected according to the invention, on defined cooling (starting from a temperature of at least 30 K above the peak temperature of the melting peak, or of at least 100° C., depending on which is the higher value, with a cooling rate of 10 K/min), exhibits a crystallization enthalpy of less than 1 J/g in differential scanning calorimetry (DSC). This crystallization enthalpy appears as an exothermic enthalpy peak in the cooling curve. Correspondingly low enthalpy values of less than 1 J/g at the cooling rate specified are representative of very low crystallization rates. The crystallites are then formed again on sufficient storage under the above-stated ambient conditions.

With further preference, the at least one crystallizable polymer selected according to the invention, after cooling as described above (starting from a temperature of at least 30 K above the peak temperature of the melting peak or of at least 100° C., depending on which is the higher value, with a cooling rate of 10 K/min), exhibits a crystallization enthalpy of less than 35 J/g, more preferably less than 10 J/g, in an immediately subsequent second heating curve in DSC measurement at a heating rate of 10 K/min.

As a result of the specified cooling rate in the first cooling curve, the crystallization enthalpy measured in the cooling curve is very low or zero—that is, the crystallization rate is so slow that very few significant crystallites, or virtually none, can be formed, the melt then being referred to as a "quenched melt" with post-crystallization nevertheless taking place in the second heating curve after the glass transition point TG has been exceeded again. This so-called cold crystallization can then be detected as an exothermic crystallization peak in the heating curve.

Overall, in fact, such polymers can also be classified as slow in their crystallization rate, but can be ordered above those which do not exhibit any crystallization enthalpy even in the second heating curve. Advantageous polymers are therefore those with a "cold crystallization enthalpy" of less than 35 J/g, more preferably less than 10 J/g, as mentioned above. Especially preferred matrix polymers are those which in a second heating curve (at a heating rate of 10 K/min), after a previous cooling operation as described above (starting from a temperature of at least 30 K above the peak temperature of the melting peak or of at least 100° C., depending on which is the higher value, at a cooling rate of 10 K/min), exhibit no crystallization enthalpy in the DSC measurement, thus having no cold crystallization.

The at least one crystallizable polymer selected according to the invention, in the pure state after cooling as described above (starting from a temperature of at least 30 K above the peak temperature of the melting peak or of at least 100° C., depending on which is the higher value, at a cooling rate of 10 K/min), preferably has, on reheating, a crystallite melting range in the range from 30 to 150° C.

Where there are two or more crystallizable polymers selected according to the invention in the polymer film former matrix, the above specifications, in one preferred procedure, are valid for all of these crystallization polymers selected according to the invention. Very preferably in accordance with the invention, the at least one crystallizable polymer selected according to the invention or the two or more crystallizable polymers selected according to the invention, each individually, is or are selected from: (i) polyurethanes preferably having units derived from polyester diols, (ii) polyesters, (iii) copolyesters, and (iv) copolyamides.

In one advantageous version of the invention, the film former matrix is formed of polymers which do not themselves have any reactive groups which participate in the curing reaction brought about by the reactive component or components. In particular the polymeric film former matrix is in that case inert toward such a curing reaction. Inert in this context means that the reactive component or components undergo substantially no reaction with the polymeric film former matrix under suitably selected conditions (e.g. at sufficient low temperatures).

Inert film former matrix polymers either have no functional groups at all, or they comprise exclusively such functional groups—optionally also from the listing stated in the paragraph below—which do not react with the selected reactive system under the selected curing conditions.

In a further advantageous version, the polymeric film former matrix itself comprises, to a small extent, reactive groups such as, for example, epoxide, hydroxyl, amino, acrylate, methacrylate, thiol, isocyanate, vinyl, anhydride or carboxyl groups, especially preferably such that up to a maximum of 15 wt % of the monomers used for synthesizing a film former matrix polymer have one or more of such functional groups. Depending on the choice of the reactive component or components and of the other constituents of the reactive system, and on the choice of the curing conditions employed, it may then be the case that the matrix polymers participate in the curing reaction to an appropriately low degree and are incorporated—weakly—into a corresponding polymer network. However, on account of their low functionality, such matrix polymers are not considered part of the reactive component or components.

As described at the outset, the polymeric film former matrix may also comprise one or more further polymers, not selected according to the invention, which are not a crystallizable polymer. Where such polymers not selected according to the invention are present, the fraction of the polymers selected according to the invention in the polymeric film former matrix is at least 50 wt %, advantageously at least 75 wt %, more advantageously at least 90 wt %.

Reactive Components (b)

As a reactive component it is possible in principle to use all macromolecule-forming reactive constituents which crosslink in a build-up reaction, as are available according to the general art knowledge in the area of pressure-sensitive adhesives or reactive adhesives and as are described in particular in the relevant prior art—see the introductory section of this specification—for reactive adhesive tapes, including, in particular, for two-component film systems. Another good overview in this regard is found for example in "Gerd Habenicht: Kleben—Grundlagen, Technologien, Anwendungen," 6th edition, Springer, 2009. Illustrative examples are constituents which form epoxides, polyesters, polyethers, polyurethanes, phenolic resin-, cresol- or novolac-based polymers, polysulfides or acrylic polymers (acrylic, methacrylic). Reactive components illustratively carry epoxide, hydroxyl, amino, acrylate, methacrylate, thiol, isocyanate, vinyl or carboxyl groups. The reactive component or the two or more reactive components each individually are preferably selected from those which carry epoxide, hydroxyl, acrylate, methacrylate or isocyanate groups.

Where the reactive component (b) comprises two or more reactive compounds, they may preferably have the same reactive group. It is, however, also possible to combine, as reactive component (b), two or more compounds which have different reactive groups, in particular selected, for instance, from the abovementioned groups.

Reactive components also encompass oligomers which carry reactive groups. An oligomer is a polymer having a few monomer units, in which a small change in the number of units is enough to bring about a marked change in properties. Oligomers in the sense of the present text are identified in particular as being macromolecules whose weight-average molecular weight is less than 5000 g/mol. Oligomers are therefore more mobile in the system than the longer-chain polymers, and are not suitable as film formers.

(b-I) Acrylate-Based Reactive Components

Particularly preferred are mono- or polyfunctional (meth) acrylates, owing to their high compatibility with the preferred polymeric film formers. Particularly preferred are the mono- or polyfunctional (meth)acrylates selected from the group of (meth)acrylates comprising cyclic aliphatic or aromatic or heterocyclic units, since they exhibit good adhesion properties. As used herein, the reactive component (b) is intended to represent a monomer which is capable in particular of radical chain polymerization. Further preferred acrylate-based reactive components are identified in the texts recited above. Especially preferred are reactive components, based for example on acrylate, which have a low vaporization rate, since this reduces loss of monomer in the reactive pressure-sensitive adhesive tape during storage. The reactive components having a low vaporization rate make up at least 50 wt % of the total fraction of the reactive component (b).

The level of the vaporization rate may be estimated indicatively from the vaporization enthalpies stated in the literature and from the molecular weight, allowing a preliminary selection to be made. In accordance with the invention, the vaporization rate is determined by storing a film 100 μm thick, lined on one side with a 50 μm polyester liner, the film consisting of 80 wt % of Desmomelt 530 and 20 wt % of the reactive component under test, storage taking place at 40° C. in a commercial drying cabinet with vapor extraction. Interactions with the polymer, and diffusion processes, are taken into account by the mixing of the reactive component with a customary polymeric film former matrix (in this case Desmomelt 530).

The film is produced as indicated below. The variable measured is the weight loss of the film without liner, Δm=m0−m, after 10 days of storage. The vaporization rate $\dot{m}_V$ is given by Equation (1):

$$\dot{m}_V = \frac{\Delta m}{0.2 \times m_0} \quad (1)$$

where the results are reported in %/10 d. Further, the reactive component (b) preferably has a vaporization rate of 60%/10 d, more preferably of less than 30%/10 d.

Besides the monomers selected according to the invention, the reactive adhesive films of the invention may comprise further reactive monomers. These may be, for example, further acrylic monomers, or vinyl compounds, especially nitrogen-containing vinyl compounds, and/or other monomeric, oligomeric or polymeric compounds having one or more carbon-carbon double bonds.

(b-II) Reactive Components Containing Epoxide Groups

As compounds containing epoxide groups for the reactive component (b) it is possibly advantageous to use organic compounds having at least one oxirane ring, which are polymerizable through a ring-opening reaction. Such materials, referred to generally as epoxides, encompass both monomeric and polymeric epoxides, and may be aliphatic, cycloaliphatic or aromatic. These materials generally have an average of at least two epoxide groups per molecule, preferably more than two epoxide groups per molecule. The "average" number of epoxide groups per molecule is defined as the number of epoxide groups in the epoxide-containing material, divided by the total number of epoxide molecules present. Alternatively or additionally to the compounds having an oxirane ring it is also possible to use oxetanes, these being 4-membered ring compounds.

Advantageously employable polymeric epoxides encompass linear polymers having terminal epoxide groups (e.g. a diglycidyl ether of a polyoxyalkylene glycol), polymers having framework oxirane units (e.g. polybutadiene-polyepoxide) and polymers having epoxide side groups (e.g. a glycidyl methacrylate polymer or copolymer). The molecular weight of the epoxide-containing material may vary from 58 to about 100000 g/mol or more. Mixtures of different epoxide-containing materials may likewise be used. Useful epoxide-containing materials include those which contain cyclohexene oxide groups, such as the epoxycyclohexanecarboxylates, exemplified by 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. A more detailed list of useful epoxides of this kind may be found in U.S. Pat. No. 3,117,099.

Further epoxide-containing materials which are particularly useful in the application of this invention include glycidyl ether monomers. Examples are the glycidyl ethers of polyhydric phenols, obtained by reacting a polyhydric phenol with an excess of chlorohydrin, such as epichlorohydrin (e.g. the diglycidyl ether of 2,2-bis(2,3-epoxypropoxyphenol)propane). Further examples of epoxides of this type which can be used in the application of this invention are described in U.S. Pat. No. 3,018,262.

There are a host of epoxide-containing materials which are obtainable commercially and can be used in this invention. Especially suitable epoxides are those which are readily obtainable, such as octadecylene oxide, epichlorohydrin, styrene oxide, vinylcyclohexene oxide, glycidol, glycidyl methacrylate, diglycidyl ethers of bisphenol A (e.g. those available under the tradenames EPON 828, EPON 1004 and EPON 1001 F from Shell Chemical Co. and DER-332 and DER-334 from Dow Chemical Co.), diglycidyl ethers of bisphenol F (e.g. ARALDITE GY281 from Ciba-Geigy), vinylcyclohexene dioxide (e.g. ERL 4206 from Union Carbide Corp.), 3,4-epoxycyclohexylmethyl 3,4-epoxycyclohexenecarboxylate (e.g. ERL-4221 from Union Carbide Corp.), 2-(3,4-epoxycyclohexyl-5,5-spiro-3,4-epoxy)cyclohexane-metadioxane (e.g. ERL-4234 from Union Carbide Corp.), bis(3,4-epoxycyclohexyl) adipate (e.g. ERL-4299 from Union Carbide Corp.), dipentene dioxide (e.g. ERL-4269 from Union Carbide Corp.), epoxidized polybutadiene (e.g. OXIRON 2001 from FMC Corp.), silicone resin-containing epoxide functionality, epoxysilanes (e.g. beta-(3,4-epoxycyclohexyl)ethyltrimethoxysilane and gamma-glycidyloxypropyltrimethoxysilane, available commercially from Union Carbide), flame-retarding epoxy resins (e.g. DER-542, a brominated epoxy resin of bisphenol type, available from Dow Chemical Co.), 1,4-butanediol diglycidyl ethers (e.g. ARALDITE RD-2 from Ciba-Geigy), hydrogenated, bisphenol A-epichlorhydrin-based epoxy resins (e.g. EPONEX 1510 from Shell Chemical Co.) and polyglycidyl ethers of phenol-formaldehyd novolac (e.g. DEN-431 and DEN-438 from Dow Chemical Co.).

In further configuration of the adhesive tape of the invention, the epoxide group-containing reactive component (b-II) comprises at least 10 wt % of epoxy resins which are liquid at 25° C., based on the epoxide group-containing reactive component (b-II). The fraction of such liquid epoxy resins in the epoxide group-containing reactive component (b-II) is more particularly 10 to 90 wt %, more preferably 20 to 75 wt %. Adhesive tapes featuring ratios of this kind between liquid and solid epoxide components display particularly well-balanced adhesive properties in the uncured state. If the desire is for an adhesive tape having particularly good flow-on properties, then the fraction of liquid epoxide components is preferably 50 to 80 wt %. For applications in which the adhesive tapes are required to support a relatively high load even in the uncured state, particular preference is given to a fraction of 15 to 45 wt %. It is possible to use one such resin or else a mixture of different resins. One measure of the flowability is the dynamic viscosity. The dynamic viscosity is determined presently in a cylindrical rotary viscometer having a standard geometry according to DIN 53019-1 (2008-09). The viscosity is measured at a temperature of 25° C. and a shear rate of 1×s-1. A fluid is a substance having a viscosity of less than 500 Pa·s.

The epoxide group-containing reactive component (b-II) may further advantageously comprise epoxycyclohexyl-based epoxy resins, in which case fractions of 5 to 80 wt % have proven to be advantageous, more preferably of 15 to 60 wt %, based in each case on the total reactive component (b). The use of liquid epoxycyclohexyl-based resins has advantageous consequences for the technical adhesive properties of the adhesives in the uncured state especially when the amount thereof used is 10 to 40 wt %. If fractions of 50 to 80 wt % are used, it is possible to produce rapidly curing pressure-sensitive adhesives by way of the high reactivity of the epoxycyclohexyl derivates in combination with the component A of the invention. The epoxycyclohexyl-based epoxy resin may be selected, for example, from the group encompassing or consisting of 3,4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate, bis((3,4-epoxycyclohexyl)methyl) adipate, dicyclopentadiene dioxide, and combinations thereof. These compounds are advantageous because of their high reactivity. These compounds are frequently liquid, leading to very soft adhesive tapes for high fractions of component B. If more solid adhesive tapes are desired, this may be achieved through the use of polymers having epoxycyclohexyl groups, which are obtainable, for example, via a radical polymerization of 3,4-epoxycyclohexylmethyl methacrylate with or without comonomers.

The epoxide group-containing reactive component (b-II) may have a mean functionality, based on the alkylene oxide groups, of at least 1.0 to 6.0, more particularly of 1.75 to 3.2, in order to achieve high bond strength. The network density may be reduced using reactive diluents, leading to less fragile adhesives, particularly in the case of high fractions of component B. Such reactive diluents typically have a functionality of 1.0. The network density can be influenced in a targeted way by the nature and composition of reactive component (b). The use of relatively high molecular weight epoxides—such as of solid bisphenol A diglycidyl ethers, for example—generally produces the network density. In that case preference is given to using epoxy resins having an epoxide equivalent of more than 400 g/eq, more particularly of more than 800 g/eq.

The epoxy or epoxide equivalent or equivalent mass (also EEW for Epoxy Equivalent Weight) indicates the amount of epoxy resin in [g] which possesses one equivalent [eq] of epoxide functions. It is computed from the molar mass in [g/mol] divided by the functionality fin [eq/mol] as given by Equation (2):

$$EEW[g/eq] = M[g/mol] / f[eq/mol]. \quad (2)$$

Concentrations are alternatively expressed as [m eq/kg] (sometimes incorrectly also described as [mmol/kg]) and as [%]. One epoxide group, i.e. 1 eq of ($C_2H_3O$), corresponds to 43 g, and so 1000 m eq/kg of epoxide correspond to 43 g of epoxide/kg, which is accordingly 4.3%. The epoxy equivalent is stated by raw materials manufacturers and determined according to ISO 3001:1999.

According to one preferred embodiment of the adhesive film of the invention, the epoxide group-containing reactive component (b-II) B comprises at least two different epoxy resins B1 and B2, of which
   a. the first epoxy resin B1 has a dynamic viscosity at 25° C. of less than 500 Pa*s, measured according to DIN 53019-1 at a temperature of 25° C. and a shear rate of $1 \times s^{-1}$, and
   b. the second epoxy resin B2 has a softening temperature of at least 45° C. or a dynamic viscosity at 25° C. of at least 1000 Pa*s, measured according to DIN 53019-1 at a temperature of 25° C. and a shear rate of $1 \times 5^{-1}$,
and, in particular, the fraction of the first epoxy resin B1 is 10 to 90 wt %, preferably 20 to 75 wt %, and the fraction of the second epoxy resin B2 is 10 to 90 wt %, preferably 25 to 80 wt %, based on the reactive component (b).

Reagents (c)

The reagents (c) are selected from an initiator, more particularly a radical initiator, or an activator or a curing agent (the latter in particular for epoxide systems). In principle it is possible here as well to select all of the reagents known from the relevant prior art for the reactive components (b) as initiators, activators and/or curing agents. Here again, reference is made in particular to the prior art cited in the introductory part of this text. Described below are a number of initiators, activators and also initiating/curing agents for epoxide systems, each of these components being advantageous per se.

(c-I) Initiators

As used herein, the term "initiator", more particularly radical initiator or radical-forming substance (or else curing agent), stands for a compound which is able to initiate a polymerization reaction or crosslinking of the adhesive. However, the initiator, especially radical initiator, participates to a very small degree in the reaction event, and consequently does not form a polymer fraction determining the properties of the adhesive bond. In the present invention, an initiator, especially radical initiator, is added to the reactive PSA film of the invention, as for example to a film of this kind having an acrylate-based reactive component.

Radical initiators are preferred. All radical initiators known in the prior art can be used. Preferred radical initiators are peroxides, hydroperoxides and azo compounds. In one particularly preferred embodiment of the invention the radical initiator is an organic peroxide. Particularly preferred are hydroperoxides, especially diisopropylbenzene hydroperoxide (CAS No. 26762-93-6). Diisopropylbenzene hydroperoxide is used preferably in the form of a 50 wt % strength solution of diisopropyl hydroperoxide in diisopropylbenzene, available under the tradename Peroxan® IHP-50 from Pergan GmbH at 46395 Bocholt, Germany. Likewise possible for use is α,α-dimethylbenzyl hydroperoxide, also known as cumene hydroperoxide (CAS No. 80-15-9). Use may also be made additionally, for example, of p-menthane hydroperoxide (CAS No. 26762-92-5), tert-amyl hydroperoxide (CAS No. 3425-61-4) or 1,1,3,3-tetramethylbutyl hydroperoxide (CAS No. 5809-08-5).

The amount of the radical initiator is situated, in accordance with the invention, in the range from about 0.1 to 20 wt %, preferably about 1 to 5 wt %, based on the total mixture of the constituents of the at least one first reactive adhesive film of the invention. The greatest preference is given to about 6 to 12 wt % of radical initiator, based on the total mixture of the constituents of the at least one first reactive adhesive film of the invention. The total mixture of the constituents of the at least one first reactive adhesive film of the invention stands here for the total amount of the polymeric film former matrix (a) used, of the reactive components (b), of the reagent (c) and also of further components present optionally, this amount being obtained as the sum total (in wt %).

(c-II) Activators

In the present invention one or more activators are added, preferably instead of or in addition to the initiator, to the reactive PSA film of the invention. Suitable activators for use in the present invention, if the system to be activated is polymerizable radically—for example an acrylate-based reactive system—are selected, for example, from the group consisting of a dihydropyridine derivative or a transition metal complex, in particular a transition metal-phthalocyanine complex. In one embodiment of the invention the activator is 3,5-diethyl-1,2-dihydro-1-phenyl-2-propylpyridine (also called PDHP, CAS No. 34562-31-7).

One preferred embodiment of the invention uses a complex compound having an iron, manganese or cobalt cation as the central atom and a phthalocyanine anion as ligand. The iron, manganese or cobalt cation in the complex compound has a double positive charge, while the phthalocyanine anion has a double negative charge. Within the complex compound, the iron, manganese or cobalt cation replaces in each case two hydrogen atoms which the ligand carried on the nitrogen atoms prior to the reaction to form the complex compound. The phthalocyanine ligands may optionally carry substituents in place of the H atoms bonded to the carbon atoms. In that case these are said to be derivatives of these compounds. Suitable substituents are selected from the group consisting of fluorine, chlorine, bromine, iodine, methyl, ethyl, propyl, isopropyl, butyl, tert-butyl, —OH, —NH2 and NO2. A particularly suitable activator comprises iron(II) phthalocyanine (CAS No. 132-16-1), manganese(II) phthalocyanine (CAS No. 14325-24-7), or cobalt(II) phthalocyanine (CAS No. 3317-67-7). The most preferred activator used is iron(II) phthalocyanine (CAS No. 132-16-1), available from Chemos GmbH at 93128 Regenstauf, Germany.

Likewise employable advantageously as activators are one or more photoredox catalysts. In the present specification, the term photoredox catalyst represents a compound which is sensitive to (UV) light and which, when excited by (UV) light, is able to mediate the transfer of electrons between chemical compounds which would otherwise react more slowly or not at all. In contrast to a photoinitiator, a photoredox catalyst does not break down into reactive cleavage products on irradiation with (UV) light, but is instead merely placed into an excited state, which in general has a relatively long life and from which redox processes can be initiated or mediated.

Suitable photoredox catalysts used in the present invention, if the system to be activated is polymerizable radically, are selected as described above. In one preferred embodiment of the invention the photoredox catalyst is a transition metal complex with ruthenium as the central atom and bipyridine or a singly or multiply substituted bipyridine derivative as ligand. In another preferred embodiment of the invention, the photoredox catalyst is a transition metal complex with iridium as the central atom and phenylpyridine or a singly or multiply substituted phenylpyridine derivative as ligand. In one particularly preferred embodiment of the invention, the photoredox catalyst is selected from the following:

i. [Tris(2,2'-bipyridyl)ruthenium(II)]$^{2+}$, [Ru(bpy)$_3$]$^{2+}$—formula (Ia)

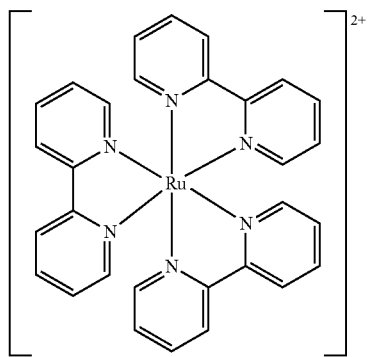

ii. Tris[2-(2,4-difluorophenyl)pyridin]iridium(III), Ir(Fppy)$_3$; CAS No.: 387859-70-3—formula (Ib)

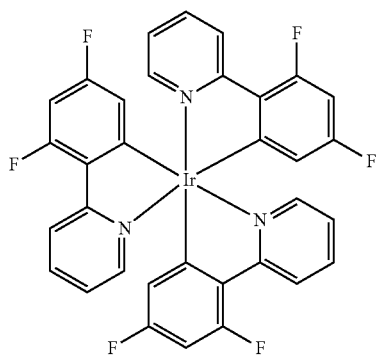

iii. Tris(2-phenylpyridinato)iridium(III), Ir(ppy)$_3$; CAS No.: 94928-86-6—formula (Ic)

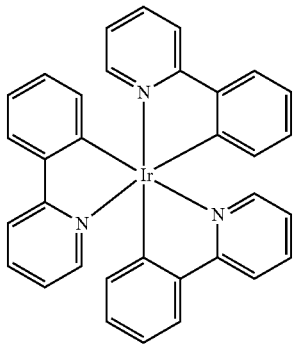

The preferred counterion to the cation of formula (Ia) is chloride. The corresponding commercially available product includes water of crystallization. The particularly preferred embodiment of the photoredox catalyst of the formula (Ia) is therefore tris(2,2'-bipyridyl)ruthenium(II) chloride hexahydrate (CAS No.: 50525-27-4), available from CHEMOS GmbH & Co. KG (http://www.chemos.de), and also the photoredox catalysts of the formula (Ic). The photoredox catalyst with the formula (Ib) is available from Strem Chemicals, Inc. (http://www.strem.com). Further examples of photoredox catalysts of the formulae (Ia) or (Ib) that are advantageously suitable in accordance with the invention include tris-(2,2'-bipyrimidine)ruthenium2+ (Ru(bpm)32+); tris-(2,2'-bipyrazine)ruthenium2+ (Ru(bpz)32+); tris-(1,10-phenanthroline)ruthenium2+ (Ru(phen)32+); bis-(2-(2',4'-difluorophenyl)-5-trifluoromethylpyridine)(ditert-butylbipyridine)iridium+ (Ir(dF(CF3)ppy)2(dtbbpy)+); bis-(2-phenylpyridine)(ditert-butylbipyridine)iridium+ (Ir(ppy)2(dtbbpy)+).

The amount of the activator is situated in accordance with the invention in the range from greater than 0 to about 10 wt %, preferably about 0.1-5.0 wt %, based on the total mixture of the constituents of the reactive PSA film of the invention. The greatest preference is given to about 0.2-3.0 wt %, more preferably still 0.5-2.0 wt %, of activator, based on the total mixture of the constituents of the at least one second reactive adhesive film of the invention. For certain activators the preferred ranges may also deviate from those stated. The total mixture of the constituents of the reactive PSA film of the invention stands here for the total amount of the polymeric film former matrix (a) used, of the reactive monomers (b), of the reagent (c) and also further components present optionally, which is obtained as the sum total (in wt %).

(c-IIa) Initiators for Cationically Curing Epoxide Systems

The cationic curing of epoxide systems can be initiated by photoinitiators. Among the photoinitiators which can be used for cationic UV-induced curing are, in particular, systems based on sulfonium, iodonium and metallocene. For examples of sulfonium-based cations, reference may be made to the observations in U.S. Pat. No. 6,908,722 B1 (especially columns 10 to 21). Examples of anions which serve as counterions for the above-stated cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulfonyl)amides and tris-(trifluoromethylsulfonyl)methides. Further anions conceivable, especially for iodonium-based initiators, are chloride, bromide or iodide, though preference is given to initiators which are substantially free of chlorine and bromine. Reference is made to the relevant prior art, such as the disclosure in WO 2017 174303 A.

(c-IIb) Curing Agents for Moisture-Curing Epoxide Systems

If a moisture-curing composition is used as reactive component (b), a moisture-activatable curing agent is preferably present as reagent (c). This curing agent advantageously comprises or consists of at least one blocked amine. A blocked amine is presently understood to comprise compounds which in the presence of water release amines. In a preferred configuration of the adhesive tape of the invention, the blocked amine, after complete reaction with water, in the deblocked state, comprises at least two amine hydrogen atoms, since compounds of this kind form thermally stable networks with epoxides that give the adhesives high bond strengths. An amine hydrogen is understood to be a hydrogen atom which is directly bonded covalently to a nitrogen atom.

In the context of the present invention, the blocked amine is preferably selected from the group encompassing or consisting of oxazolidines, imines, enamines, silylamines or combinations of these, with the blocked amine more particularly being an oxazolidine. A great advantage of oxazolidines is their commercial availability, the high reactivity of the secondary amine released, and the unobjectionable elimination product which is also released in the deblocking step. Accordingly it is particularly preferable for the blocked amine to comprise at least two oxazolidine groups.

When using imines, especially aldimines, it is advantageous to add a moisture-latent acid selected in particular from alkenyl esters such as, for example, vinyl acetate, silyl esters, or mixtures of these. The amount of moisture-latent acid, based on the amount of imine, is in particular 0.001 to 0.15 mol of moisture-latent acid per mole of imine, preferably 0.01 to 0.1 mol of moisture-latent acid per mole of imine.

The moisture-curing composition may optionally comprise one more stabilizers. The stabilizer in this case is preferably selected from water scavengers, amine scavengers and combinations of these. Using these stabilizers, it is possible to improve the shelf life of the adhesive film of the invention. Reference is made to the prior art and to the disclosure in WO 2017 186528 A.

Additives

Further to the aforesaid components (a), (b) and (c), the PSA film may comprise additives. In this context it is possible in principle to use the additives identified in the prior art for the present invention as well. Additives or adjuvants contemplated are all adjuvants known to the skilled person for adhesive tapes and PSAs, such as, for example, accelerators, tackifier resins, rheology modifiers, foaming agents, fillers, adhesion promoters, polyols, ageing inhibitors, light stabilizers, dyes, impact modifiers, phenoxy resins or mixtures of these.

For the present invention it is possible here to make optional use of tackifier resins, in order to adjust the pressure-sensitive adhesive properties of the adhesive film of the invention. Tackifier resins, of the kind frequently used for adhesives, especially for PSAs, differ from the reactive components (b), the latter often also being called reactive resins. A "tackifier resin" in accordance with the general understanding of a skilled person is an oligomeric or polymeric resin which merely increases the adhesion (the tack, the intrinsic stickiness) of the PSA by comparison with the otherwise identical PSA containing no tackifier resin. Apart from double bonds (in the case of the unsaturated resins), tackifier resins typically contain no reactive groups, since their properties are intended not to change over the lifetime of the PSA. In particular, tackifier resins differ from the reactive component or components (reactive resins) in being oligomeric or polymeric compounds which do not participate in the curing reaction.

Examples of tackifier resins for relatively apolar PSAs are partially or fully hydrogenated resins based on rosin and rosin derivatives, hydrogenated polymers of dicyclopentadiene, partially, selectively or fully hydrogenated hydrocarbon resins based on C5, C5/C9 or C9 monomer streams, polyterpene resins based on α-pinine and/or β-pinene and/or δ-limonene and/or Δ3-carene, and hydrogenated polymers of preferably pure C8 and C9 aromatics. Aforesaid tackifier resins may be used either alone or else in a mixture. For polar PSAs, polar resins are known to the skilled person as being compatible, examples being terpene-phenol-based or rosin-based resins. The aforementioned rosin resins include, for example, natural rosin, polymerized rosin, partly hydrogenated rosin, fully hydrogenated rosin, esterified products of these types of rosin (such as glycerol esters, pentaerythritol esters, ethylene glycol esters and methyl esters) and rosin derivatives (such as disproportionation rosin, fumaric acid-modified rosin and lime-modified rosin). Also known are tackifier resins based on acrylates and methacrylates. Reference is made to the depiction of the state of knowledge in the "Handbook of Pressure Sensitive Adhesive Technology" by Donatas Satas (van Nostrand, 1989), chapter 25, "Tackifier Resins".

Reactive PSA Film System

In one advantageous version of the invention, two PSA films of the invention are used in the form of a reactive PSA film system which is characterized in that the first reactive PSA film A comprises not only the film former matrix (a) and at least one reactive component (b) but also an initiator (c), more particularly a radical initiator, and the second reactive PSA film B comprises not only the film former matrix (a) and at least one reactive component (b) but also an activator and/or curing agent (c). An activator used is preferably iron(II) phthalocyanine. Initiator and activator/curing agent in this context are tailored to one another more particularly such that a curing reaction is not significantly initiated by means of the reactive components until the films are brought into contact with one another.

Further provided by the invention is a reactive PSA film system comprising two or more reactive PSA films as defined above, characterized in that a first reactive PSA film A comprises an initiator, more particularly a radical initiator, and a second reactive PSA film B comprises an activator, and these two reactive PSA films A and B are present each in alternation. The first and second reactive PSA films A and B cure and crosslink optionally as soon as they are brought into surface contact under moderate pressure, more particularly 0.5 to 3 bar, at room temperature (23° C.). Alternatively, higher or lower pressures and/or temperatures are also possible. The stated moderate pressure is intended in particular to be easily attainable by hand. The contact time in accordance with the invention, at room temperature, is a number of seconds to a number of minutes, preferably 10 to 60 seconds. The pressure may be applied by machine or manually.

When the two reactive PSA films A and B, as described above, are applied beforehand to the substrates where bonding is to take place, the above-described curing and optional crosslinking produce a permanent bonding of the substrates.

Alternatively, it is also possible first for PSA film A to be applied to the first substrate to be bonded, and for PSA film B to be applied to PSA film A. Subsequently the second substrate to be bonded is then applied to PSA film B. Preliminary positioning is facilitated by the pressure-sensitive adhesiveness of the films.

The reactive PSA film system of the invention may further comprise additional films, layers, adhesives and also permanent and/or temporary carriers, and may therefore constitute an adhesive tape. The reactive PSA film preferably takes the form of an adhesive transfer tape, thus being present prior to application between flexible liners, which are provided with a release layer and/or have anti-adhesive properties. Suitable carrier materials are known to a person skilled in the art. By way of example it is possible as permanent carriers to use film materials (polyesters, PET, PE, PP, BOPP, PVC, polyimides), nonwovens, foams, woven fabrics and/or woven film materials. Temporary carriers ought to be provided with a release layer, with the release layer consisting in general of a silicone release varnish or a fluorinated release varnish, or being polyolefinic in nature (HDPE, LDPE).

It may possibly be necessary for the surfaces of the substrates where bonding is to take place to be pretreated by a physical, chemical and/or physio-chemical method. Advantageous here, for example, is the application of a primer or of an adhesion promoter composition.

In other versions of the invention, single-layer, two-layer or multi-layer PSA film systems composed of PSA films of the invention are brought to curing by the use of a trigger such as, for example, plasma, radiation—such as electron beams or light (UV, IR, visible light, etc.)—or heat as initiator, with an initiator or activator or curing agent present being actually activated in this way, in particular. Triggers other than the plasma stated in these texts are likewise possible in accordance with the invention—for instance, the effect of moisture for moisture-curing systems. In connection with the aforesaid mechanisms, mention may be made not only of acrylate-based reactive systems but also, in particular, of the above-discussed reactive epoxide or reactive epoxide-curing agent systems. Reference is made to the texts cited earlier on this text—for instance WO 2015 150251 A and WO 2017 021085 A. A further version of the invention comprises a laser-ablatable layer and also a method as shown in WO 2017 102282.

EXAMPLES

Test Methods:
I. Determination of Crystallite Melting or Crystallization Enthalpy by Means of DSC The crystallite melting enthalpy or crystallization enthalpy is determined by differential scanning calorimetry according to DIN EN ISO 11357-3:2013-04. Approximately 7 mg of the sample are weighed out into an aluminium crucible and then introduced into the measuring instrument (instrument: DSC 204 F1 from Netzsch). An empty crucible is used as a reference. Measurement takes place in a nitrogen atmosphere.

The measuring program used was as follows:
(1) Cooling from room temperature (23° C.) to −140° C.; cooling rate −10 K/min
(2) Heating to a temperature at least 30 K above the peak temperature of the melting peak, but at least +100° C.; heating rate+10 K/min
(3) Cooling to −140° C.; cooling rate−10 K/min
(4) Heating to a temperature at least 30 K above the peak temperature of the melting peak, but at least +100° C., heating rate+10 K/min.

The precise choice of the target temperature for heating is made so as to exceed the anticipated melting temperature by at least 30 K, and amounts to at least +100° C. The crystallite melting enthalpies or crystallization enthalpies are determined by integrating the corresponding peaks and are reported in J/g. The peak temperature is taken to be the peak extreme value.

II. Push-Out Test

The push-out test provides information on the bond strength of an adhesive product in the direction of the adhesive layer normal. A circular first substrate (also termed "substrate 1") with diameter 21 mm is bonded using the adhesive film system under test (in each case circular die-cut or cut-to-size specimen, diameter 21 mm) on a square second substrate (also termed "substrate 2"), dimensions 40 mm×40 mm. The second substrate has a circular opening (hole) in the center with a diameter of 9 mm. The center of the first substrate, the adhesive film assembly and the second substrate are congruent (centered bonding of all components).

Production of the assembly: adhesive film A is pre-laminated congruently at 23° C. onto the first substrate, and adhesive film B is pre-laminated congruently onto adhesive film A. The preliminary assembly composed of the first substrate and the adhesive films A and B is then positioned with centering on the second substrate, by the side of the adhesive film B. The overall assembly is then pressed under a pressure of 3 bar at 23° C. for 30 s. The overall assembly is cured for 48 h at 23° C. and 50% relative humidity.

Using a cylindrical ram, which is clamped into a tensile testing machine, pressure is applied in the middle through the hole in substrate 2, with a vertical pressure direction, onto the assembly composed of the adhesive films and first substrate, to exert a force on the bondline in the assembly. The second substrate is fastened in the tensile testing machine in such a way as to ensure flat placement/fastening as far as possible all around, allowing the assembly of adhesive films and first substrate to be pressed out freely by the ram. The test velocity (pressure movement of the ram) is 10 mm/min.

The force at which the bond fails and the assembly of the first substrate and second substrate is parted is recorded. The force is expressed relative to the bond area (282 mm2), resulting in push-out strengths in units of N/mm2(=MPa). The test conditions are 23° C. and 50% relative humidity. The results are mean values from three individual tests and are reported in MPa. In the examples of the disclosure, the substrates used (see Table 1 F below): First substrate: polycarbonate (PC; Makrolon GP 099; 3 mm thick); and Second substrate: polycarbonate or glass fibre-reinforced polyamide (PA; Ultramid B3WG5, PA6-GF25, 3 mm thick) or anodized aluminium (Al; E6EV1; 1 mm thick). For reactive PSAs, the target is a push-out strength of at least 1 MPa on PC; good push-out strength on PC is attained at not less than 2.5 MPa.

III. Storage Stability

The storage stability is evaluated in the push-out test (as per test II) after storage of the uncured adhesive films, as listed below in Table 1 F. The storage takes place with the films welded into a pouch of aluminium composite film material; conditions on introduction into the pouch and during storage: temperature 23° C. and 50% relative humidity. The adhesive films after storage are used to produce the test assembly as per test II. The values for the adhesive films used after this storage are compared with those of the adhesive films produced freshly and then used. In particular, a drop in the test values relative to the fresh values to not less than half after 21 days of storage is rated as sufficient storage stability.

Selection of the Matrix Polymers:

A multiplicity of commercially available polymers were studied by DSC in order to be able to identify the polymers suitable according to the invention, the polymers preferred according to the invention and the polymers unsuitable according to the invention, from the peak temperatures of the various cooling and heating curves. The list below in Table 1A, however, provides only an example of the respective representatives, and does not fundamentally limit the invention to the particular polymers studied. In particular, Table 1 A shows that the skilled person is able to use the manufacturer information on the crystallization behavior to make a preliminary selection without costly and inconvenient DSC measurement.

As reported in Table 1A:

H(↓): Crystallization enthalpy in the DSC measurement on cooling starting from a temperature which is at least 30 K above the peak temperature of the melting peak but at least 100° C., at a cooling rate of 10 K/min. Target value: H(↓)<1 J/g H(↑) Crystallization enthalpy in the DSC measurement of a second heating curve, immediately following the above-described cooling procedure, at a heating rate of 10 K/min.

Preferably H(↑)<26 J/g, more preferably H(↑) <10 J/g

H(S): Crystallite fusion enthalpy in the first heating curve of the DSC measurement after defined storage; heating rate 10 K/min. Defined storage: storage time at least 1 month at a temperature in the range from 15 to 25° C. and relative humidity in the range from 30 to 70%.

Target value: H(S) >15 J/g, preferably H(S) >25, more preferably 50 J/g >H(S) >15 J/g.

Column 8:

i: inventive (target value H(↓) met)

ip: inventively preferred ni: not inventive

Column 9: used in reported example

TABLE 1A

Suitable polymers of the PSA films of the disclosure

| Tradename (registered trademark) | Manufacturer | Manufacturer information on crystallization | Chemical basis | H(↓) DSC J/g | H(↑) DSC J/g | H(S) DSC J/g | 8 | 9 |
|---|---|---|---|---|---|---|---|---|
| Desmocoll 406 | Covestro | low crystallization rate | PE-PU | 0 | 0 | 35.4 | ip | |
| Desmomelt 530 | Covestro | strongly crystallizing | PE-PU | 1.83 | 27.7 | 53.6 | ni | V1 |
| Desmocoll 530-2 | Covestro | strongly crystallizing | PE-PU | 0 | 31.91 | 55.91 | i | |
| Desmocoll 526 | Covestro | low crystallization rate | PE-PU | 0 | 0 | 34.05 | ip | E1 E3, E4, E8, E9, E12 |
| Epacol TK42 | Epaflex | high crystallization rate | PE-PU | 32.92 | 0 | 53.3 | ni | |
| Epacol TK570 | Epaflex | very high crystallization rate | PE-PU | 35.42 | 0 | 62.34 | ni | |
| Epacol TK54 | Epaflex | high crystallization rate | PE-PU | 0 | 31.14 | 48.2 | i | |
| Pearlstick 40-70/08 | Lubrizol | extremely high crystallization rate | PE-PU | 38.02 | 0 | 59.73 | ni | |
| Pearlstick 40-70/14 | Lubrizol | extremely high crystallization rate | PE-PU | 49.56 | 0 | 65.15 | ni | |
| Pearlstick 45-80/16 | Lubrizol | very slow | PE-PU | 0 | 2.28 | 41.82 | ip | E2 |
| Pearlstick 46-10/01 | Lubrizol | very high crystallization rate | PE-PU | 38.71 | 0 | 50.08 | ni | |
| Pearlstick 46-10/06 | Lubrizol | very high crystallization rate | PE-PU | 39.43 | 0 | 51.61 | ni | |
| Pearlstick 46-10/12 | Lubrizol | very high crystallization rate | PE-PU | 42.31 | 0 | 54.62 | ni | |
| Pearlstick 46-10/16 | Lubrizol | very high crystallization rate | PE-PU | 33.58 | 3.04 | 53.31 | ni | |
| Pearlstick 48-60/08 | Lubrizol | very high crystallization rate | PE-PU | 30.27 | 7.65 | 55.02 | ni | |
| Pearlstick 48-60/15 | Lubrizol | very high crystallization rate | PE-PU | 3.98 | 30.87 | 52.6 | ni | |
| Pearlbond 960 EXP | Lubrizol | soft hotmelt | PEt-PU | 0 | 0 | 5.87 | ni | |
| Pearlbond 360 EXP | Lubrizol | soft hotmelt | PEt-PU | 0 | 0 | 1.51 | ni | V3, V4 |
| Irostic S6148-16 | Huntsman | low crystallization rate | PE-PU | 0 | 8.83 | 40.98 | ip | E5 |
| Irostic S6440-05 | Huntsman | low crystallization rate | PE-PU | 0 | 33.56 | 49.79 | i | |
| Irostic S6440-12 | Huntsman | low crystallization rate | PE-PU | 0 | 29.28 | 42.51 | i | E6 |
| Irostic S6558-06 | Huntsman | low crystallization | PE-PU | 0 | 0 | 23.87 | ip | E7 |

TABLE 1A-continued

Suitable polymers of the PSA films of the disclosure

| Tradename (registered trademark) | Manufacturer | Manufacturer information on crystallization | Chemical basis | H(↓) DSC J/g | H(↑) DSC J/g | H(S) DSC J/g | 8 | 9 |
|---|---|---|---|---|---|---|---|---|
| Irostic S6558-08 | Huntsman | low crystallization rate | PE-PU | 0 | 0 | 22.21 | ip | |
| Irostic S7614-08 | Huntsman | low crystallization rate | PE-PU | 0 | 31.34 | 40.31 | i | |
| Irostic S7614-12 | Huntsman | low crystallization rate | PE-PU | 0 | 30.63 | 40.82 | i | |
| Irostic S7614-14 | Huntsman | low crystallization rate | PE-PU | 0 | 30.48 | 41.75 | i | |
| Irostic S7730-05 | Huntsman | strong crystallization rate | PE-PU | 5.13 | 30.66 | 46.64 | ni | |
| Irostic S8612-12 | Huntsman | strong crystallization rate | PE-PU | 45.28 | 0 | 56.77 | ni | |
| Irostic S8743-12 | Huntsman | low crystallization rate | PE-PU | 2.92 | 25.29 | 51.19 | ni | |
| Irostic S8743-16 | Huntsman | low crystallization rate | PE-PU | 1.71 | 25.34 | 46.88 | ni | |
| Irostic S9815-08 | Huntsman | strong crystallization rate | PE-PU | 50.6 | 0 | 63.92 | ni | |
| Irostic S9815-12 | Huntsman | strong crystallization rate | PE-PU | 40.03 | 3.13 | 53.84 | ni | |
| Irostic S9815-14 | Huntsman | strong crystallization rate | PE-PU | 40.39 | 0 | 57.75 | ni | |
| Irostic S9827-12 | Huntsman | very strong crystallization rate | PE-PU | 0 | 30.77 | 47.57 | i | |
| Irostic S9827-18 | Huntsman | very strong crystallization rate | PE-PU | 0 | 30.31 | 45.97 | i | |
| Elvax 40L-03 | Dow | n.a. | EVA | 33.4 | 0 | 44.12 | ni | |
| Elvax 150W | Dow | n.a. | EVA | 52.56 | 0 | 53.62 | ni | |
| Elvax 250A | Dow | n.a. | EVA | 56.11 | 0 | 66.77 | ni | |
| Elvax R260 | Dow | n.a. | EVA | 60.54 | 0 | 72.53 | ni | |
| Elastolan 1185A | BASF | n.a. | PEt-PU | 0 | 0 | 2.24 | ni | |
| Platamid M 1276 | Arkema | n.a. | CPA | 0 | 25.68 | 29.41 | i | E11 V2 |
| Levamelt 456 | Arlanxeo | low crystallinity | EVA | 19.88 | 0 | 19.4 | ni | |
| Lotader 4403 | Arkema | n.a. | TP | 52.02 | 0 | 56.12 | ni | |
| Dynacoll S-1401 | Evonik | slightly crystalline | CPE | 0 | 0.63 | 15.03 | i | E10 |

(**) Chemical basis:
PE-PU = polyester-polyurethane
EVA = ethylene-vinyl acetate copolymer
PEt-PU = polyether-polyurethane
CPA = copolyamide
TP = terpolymer of ethylene, acrylic ester (18%) and maleic anhydride (0.3%)
CPE = copolyester The following polymers listed in Table 1B below are amorphous or substantially amorphous (inadequate crystallinity) and can therefore not be used (on their own) according to the invention.

TABLE 1B

Amorphous and substantially amorphous polymers for the PSA films

| Tradename (registered trademark) | Manufacturer | Chemical basis | | Used in Example(s) |
|---|---|---|---|---|
| Levamelt 700 | Arlanxeo | Ethylene-vinyl acetate | amorphous | |
| Levamelt 900 | Arlanxeo | Ethylene-vinyl acetate | amorphous | |
| PKHA | InChemRez | Phenoxy resin | amorphous | |
| PKHB | InChemRez | Phenoxy resin | amorphous | |
| PKHH | InChemRez | Phenoxy resin | amorphous | |
| Lotader AX 8900 | Arkema | Terpolymer of ethylene, acrylic ester and glycidyl methacrylate | low crystallininity | |

TABLE 1B-continued

Amorphous and substantially amorphous polymers for the PSA films

| Tradename (registered trademark) | Manufacturer | Chemical basis | | Used in Example(s) |
|---|---|---|---|---|
| HYTEMP 4054 Dynacoll S-EP1408 | Nippon Zeon Evonik | Polyacrylate elastomer Copolyester | amorphous low crystallininty | |
| Nipol 1001 CG | Zeon Chemicals | Hot-polymerized acrylonitrile-butadiene copolymer (41% ACN) | amorphous | E12, V5 |

Raw Materials:

The raw materials used in the samples in this example are listed below in Table 1C.

TABLE 1C

Raw materials employed in the PSA films

| Chemical | Short form | CAS No. and source |
|---|---|---|
| 3,4-epoxycyclo-hexylmethyl methacrylate | TTA15 | CAS 2386-87-0, TTA ® 15 (from Synasia) Vaporization rate 96%/10 d |
| Trimethylolpropane propoxylate triacrylate | TMPPTA | CAS 53879-54-2, (from Sigma-Aldrich) Vaporization rate 4%/10 d |
| Iron(II) phthalocyanine | FePc | CAS 132-16-1, (from Sigma Aldrich) |
| Diisopropylbenzene monohydroperoxide | Peroxan | CAS 26762-93-6, 50 wt % solution of diisopropyl hydroperoxide in diisopropylbenzene Peroxan ® IHP-50 (from Pergan) |
| 2-hydroxy-3-phenoxypropyl acrylate | CN131B | CAS 16969-10-1, CN131 B ® (from Sartomer) Vaporization rate 2%/10 d |
| 3-methacryloxypropyl-trimethoxysilane | MEMO | CAS 2530-85-0, Dynasylan MEMO ® (from Evonik) |
| Aerosile ® R 202 | R202 | Hydrophobized fumed silica (from Evonik) |
| Phenoxyethyl methacrylate | PHEMA | CAS 10595-06-9, Miramer M141 ® (from Miwon) Vaporization rate 55%/10 d |
| 2-phenoxyethyl acrylate | PEA | CAS 48145-04-6, (from Sigma-Aldrich) Vaporization rate 53%/10 d |

Production of the Examples

Each of the inventive examples E1 to E12 and the comparative examples V1 to V5 comprises a PSA film system composed of two reactive PSA films, with the first reactive PSA film (also termed "tape A") comprising a radical initiator and the second reactive PSA film (also termed "tape B") comprising an activator. The components (a) polymeric film former matrix and (b) reactive component(s) are selected identically for the tapes A and B in each individual example. The specific composition of tapes A and B for each example is indicated in wt % in the two Tables 1D and 1E below. Each of the examples is therefore made up of a tape A from Table 1D and a tape B from Table 1E, indicated for the respective example, as a two-adhesive film system. Chemical curing is initiated by the assembling of the films.

Production of the First Reactive PSA Adhesive Film (Tape A), Comprising a Radical Initiator:

An approximately 20% solution of the matrix polymer (polymer solution) is mixed unless otherwise indicated with the 3,4-epoxycyclohexyl methylmethacrylate, the trimethylolpropane propoxylate triacrylate and also the diisopropyl hydroperoxide and the Aerosil® R202 using a commercial laboratory stirrer for 60 minutes. The homogeneous mixture obtained is coated out using a commercial laboratory coating unit (from SMO (Sondermaschinen Oschersleben GmbH), for example) with a coating knife onto a siliconized polyester film material (release liner). The acetone is subsequently evaporated off at 60° C. in a forced-air drying cabinet for 10 minutes. The slot width during coating out is set such that the film obtained after evaporation of the solvent is 50 μm thick. The pressure-sensitive adhesive reactive film A obtained is lined with a second siliconized polyester film material (release liner) and stored prior to bonding.

Production of the Second Reactive PSA Adhesive Film (tape B), Comprising an Activator:

An approximately 20% solution of the matrix polymer (polymer solution) is mixed unless otherwise indicated with the 3,4-epoxycyclohexyl methylmethacrylate, the trimethylolpropane propoxylate triacrylate and also the iron phthalocyanine and the Aerosil® R202 using a commercial laboratory stirrer for 60 minutes. The homogeneous mixture obtained is coated out using a commercial laboratory coating unit (from SMO (Sondermaschinen Oschersleben GmbH), for example) with a coating knife onto a siliconized polyester film material (release liner). The acetone is subsequently evaporated off at 60° C. in a forced-air drying cabinet for 10 minutes. The slot width during coating out is set such that the film obtained after evaporation of the solvent is 50 μm thick. The pressure-sensitive adhesive reactive film B obtained is lined with a second siliconized polyester film material (release liner) and stored prior to bonding. The solvent used unless indicated otherwise was acetone.

TABLE 1D

Composition of tape A (in each case in wt %)

| Example | Type of matrix polyer | Matrix polymer | TTA15 | PHEMA | PEA | CN131B | TMPPTA | Peroxan (Initiator Tape A) | MEMO | R202 |
|---|---|---|---|---|---|---|---|---|---|---|
| V1 | Desmomelt 530 | 32.97 | 44.02 | | | | 2.81 | 9.37 | 0.94 | 9.89 |
| V2 | Platamid M1276 | 32.97 | 44.02 | | | | 2.81 | 9.37 | 0.94 | 9.89 |
| V3 | Pearlbond 360 EXP | 37.97 | 39.02 | | | | 2.81 | 9.37 | 0.94 | 9.89 |
| V4 | Pearlbond 360 EXP | 32.97 | | 44.02 | | | 2.81 | 9.37 | 0.94 | 9.89 |
| V5 | Nipol 1001 CG | 32.97 | 44.02 | | | | 2.81 | 9.37 | 0.94 | 9.89 |
| E1 | Desmocoll 526 | 32.97 | 44.02 | | | | 2.81 | 9.37 | 0.94 | 9.89 |
| E2 | Pearlstick 45/80-16 | 32.97 | 44.02 | | | | 2.81 | 9.37 | 0.94 | 9.89 |
| E3 | Desmocoll 526 | 32.97 | 22.01 | | | 22.01 | 2.81 | 9.37 | 0.94 | 9.89 |
| E4 | Desmocoll 526 | 15.00 | 61.99 | | | | 2.81 | 9.37 | 0.94 | 9.89 |
| E5 | Irostic S6148-16 | 32.97 | 44.02 | | | | 2.81 | 9.37 | 0.94 | 9.89 |
| E6 | Irostic S6440-12 | 32.97 | 44.02 | | | | 2.81 | 9.37 | 0.94 | 9.89 |
| E7 | Irostic S6558-06 | 32.97 | 44.02 | | | | 2.81 | 9.37 | 0.94 | 9.89 |
| E8 | Desmocoll 526 | 32.97 | | | 44.02 | | 2.81 | 9.37 | 0.94 | 9.89 |
| E9 | Desmocoll 526 | 32.97 | | 44.02 | | | 2.81 | 9.37 | 0.94 | 9.89 |
| E10 | Dynacoll S-1401 | 43.00 | 34.59 | | | | 2.21 | 9.37 | 0.94 | 9.89 |
| E11 | Platamid M1276 | 25.00 | 51.99 | | | | 2.81 | 9.37 | 0.94 | 9.89 |
| E12 | Nipol 1001 CG/ Desmocoll 526 = 1:1 | 32.97 | 44.02 | | | | 2.81 | 9.37 | 0.94 | 9.89 |

TABLE 1E

Composition of tape B (in each case in wt %)

| Example | Type of matrix polymer | Matrix polymer | TTA15 | PHEMA | PEA | CN131B | TMPPTA | FePc Activator Tape B | MEMO | R202 |
|---|---|---|---|---|---|---|---|---|---|---|
| V1 | Desmomelt 530 | 36.63 | 47.34 | | | | 3.02 | 1.01 | 1.01 | 10.99 |
| V2 | Platamid M1276 | 36.63 | 47.34 | | | | 3.02 | 1.01 | 1.01 | 10.99 |
| V3 | Pearlbond 360 EXP | 41.63 | 42.34 | | | | 3.02 | 1.01 | 1.01 | 10.99 |
| V4 | Pearlbond 360 EXP | 36.63 | | 47.34 | | | 3.02 | 1.01 | 1.01 | 10.99 |
| V5 | Nipol 1001 CG | 36.63 | 47.34 | | | | 3.02 | 1.01 | 1.01 | 10.99 |
| E1 | Desmocoll 526 | 36.63 | 47.34 | | | | 3.02 | 1.01 | 1.01 | 10.99 |
| E2 | Pearlstick 45/80-16 | 36.63 | 47.34 | | | | 3.02 | 1.01 | 1.01 | 10.99 |
| E3 | Desmocoll 526 | 36.63 | 23.67 | | | 23.67 | 3.02 | 1.01 | 1.01 | 10.99 |
| E4 | Desmocoll 526 | 15.00 | 68.97 | | | | 3.02 | 1.01 | 1.01 | 10.99 |
| E5 | Irostic S6148-16 | 36.63 | 47.34 | | | | 3.02 | 1.01 | 1.01 | 10.99 |

TABLE 1E-continued

Composition of tape B (in each case in wt %)

| Example | Type of matrix polymer | Matrix polymer | TTA15 | PHEMA | PEA | CN131B | TMPPTA | FePc Activator Tape B | MEMO | R202 |
|---|---|---|---|---|---|---|---|---|---|---|
| E6 | Irostic S6440-12 | 36.63 | 47.34 | | | | 3.02 | 1.01 | 1.01 | 10.99 |
| E7 | Irostic S6558-06 | 36.63 | 47.34 | | | | 3.02 | 1.01 | 1.01 | 10.99 |
| E8 | Desmocoll 526 | 36.63 | | | | 47.34 | 3.02 | 1.01 | 1.01 | 10.99 |
| E9 | Desmocoll 526 | 36.63 | | | 47.34 | | 3.02 | 1.01 | 1.01 | 10.99 |
| E10 | Dynacoll S-1401 | 47.30 | 37.30 | | | | 2.39 | 1.01 | 1.01 | 10.99 |
| E11 | Platamid M1276 | 26.63 | 57.34 | | | | 3.02 | 1.01 | 1.01 | 10.99 |
| E12 | Nipol 1001 CG/ Desmocoll 526 = 1:1 | 36.63 | 47.34 | | | | 3.02 | 1.01 | 1.01 | 10.99 |

All of the inventive and comparative examples produced with the exception of V2 showed pressure-sensitive adhesiveness, specifically peel adhesions in the uncured state of more than 1 N/cm in accordance with the measurement method set out within this specification for determining pressure-sensitive adhesiveness. In the case of V2 this value was below 1 N/cm.

Storage Stability:

The storage stability was determined by means of the push-out test after different storage times. Table 1F below summarizes the results:

TABLE 1F

Push-out test results: Examples E1-E12 and Comparative Examples V1-V4

| Example | Substrate 2 | Fresh [MPa] | 7 days [MPa] | 14 days [MPa] | 21 days [MPa] | 28 days [MPa] | 2 months [MPa] |
|---|---|---|---|---|---|---|---|
| E1 | PC | 4.7 | 3.0 | 3.5 | 3.4 | | 3.3 |
| | PA | 3.6 | 2.0 | 2.6 | 2.1 | | 1.9 |
| | Al | 5.2 | 4.2 | 3.5 | 3.2 | | 3.2 |
| E2 | PC | 4.3 | 4.4 | 3.1 | 3.6 | | |
| | PA | 2.6 | 2.2 | 1.4 | 1.6 | | |
| | AL | 3.7 | 4.5 | 2.9 | 3.3 | | |
| E3 | PC | 6.6 | 7.4 | 7.2 | 7.5 | | |
| | PA | 2.7 | 2.4 | 2.0 | 2.1 | | |
| | AL | 4.9 | 5.0 | 4.1 | 3.3 | | |
| E4 | PC | 1.1 | | | | | |
| | PA | 0.8 | | | | | |
| | AL | 0.8 | | | | | |
| E5 | PC | 7.7 | 6.3 | 7.0 | 6.5 | 7.3 | |
| | PA | 2.2 | 2.1 | 2.3 | 2.4 | 1.7 | |
| | Al | 5.4 | 4.7 | 4.2 | 4.3 | 3.8 | |
| E6 | PC | 4.4 | 4.4 | 5.1 | 4.6 | 5.0 | |
| | PA | 2.2 | 2.5 | 4.6 | 3.8 | 3.5 | |
| | Al | 6.0 | 5.9 | 6.6 | 6.7 | 6.3 | |
| E7 | PC | 6.4 | 6.6 | 6.5 | 6.6 | 6.0 | |
| | PA | 1.9 | 2.0 | 2.5 | 2.5 | 2.0 | |
| | Al | 7.2 | 5.1 | 6.1 | 5.1 | 4.5 | |
| E8 | PC | 7.2 | 6.9 | 7.0 | | | |
| | PA | 2.0 | 2.1 | 1.9 | | | |
| | Al | 2.0 | 1.5 | 1.3 | | | |
| E9 | PC | 6.3 | 6.0 | 5.8 | | | |
| | PA | 2.1 | 1.8 | 1.5 | | | |
| | Al | 2.3 | 1.9 | 1.5 | | | |
| E10 | PC | 2.9 | 3.0 | 2.5 | | | |
| | PA | 1.9 | 1.9 | 1.6 | | | |
| | AL | 2.0 | 1.7 | 1.9 | | | |
| E11 | PC | 5.7 | 4.1 | 3.4 | | | |
| | PA | 3.9 | 3.0 | 2.6 | | | |
| | AL | 4.4 | 3.9 | 3.2 | | | |
| E12 | PC | 1.9 | 2.0 | 2.0 | | | |
| | PA | 1.3 | 1.4 | 1.3 | | | |
| | Al | 1.3 | 1.0 | 1.2 | | | |
| V1 | PC | 3.8 | | | 1.7 | | 1.1 |
| | PA | 2.2 | | | 1.0 | | 0.9 |
| | Al | 2.8 | | | 1.1 | | 0.9 |
| V3 | PC | 1.5 | 2.0 | 2.0 | | | |
| | PA | 0.9 | 1.1 | 0.8 | | | |
| | Al | 1.5 | 1.3 | n.a. | | | |
| V4 | PC | 2.1 | | | | | |
| | PA | 0.7 | | | | | |
| | Al | 2.0 | | | | | |
| V5 | PC | <1 | | | | | |
| | PA | <1 | | | | | |
| | Al | <1 | | | | | |

Assessment of the Examples

The strength in the fresh state and also after storage was determined in the push-out test. Examples V1 (comparative) and E1 (inventive) were compared with one another over a storage period of two months. While comparative example V1—which is part of the prior art—exhibits a significant drop in strength after storage, the storage stability of example E1 is significantly improved, even over a period of several months.

Examples E1, E2 and also E5 to E7 show advantageous configurations of the invention each with slow-crystallizing polymers as the matrix.

E6 in comparison to V1 illustrates that as well as the slow crystallization rate according to the invention, the magnitude of the crystallite fusion enthalpy in the first heating curve has an effect on the storage stability and is therefore preferably not more than 50 mJ/mg.

A comparison of examples E1, E3, E8 and E9, all of which use Desmocoll 526—here a polyester-polyurethane preferred according to the invention—as matrix polymer demonstrates that the utilization of different reactive components (3,4-epoxycyclohexylmethyl methacrylate, tri methylolpropane propoxylate triacrylate, phenoxymethyl methacrylate or 2-phenoxymethyl acrylate) leads in each case to results with good storage stability, and the effect according to the invention can therefore be attributed critically to the matrix polymer used.

The comparison of example E4 with example E1 shows that an excessive fraction of reactive component (b)—in this case the likewise-used reactive component 3,4-epoxycyclohexylmethyl methacrylate as in example E1—leads to a drop in the fresh push-out values on all substrates studied. From this it is apparent that as well as the mass fraction of the reactive component or components of at least 30 wt % according to the invention, it is also advantageous not to exceed the upper limit, which, however, is dependent on the components selected and for the skilled person is situated recognizably at 70 wt %.

Inventive example E10 demonstrates that a sufficiently handling-stable, pressure-sensitive adhesive film can be obtained by raising the polymer fraction in the overall formulation in the case of a polymer selected in accordance with the invention but of low crystallinity. With a value of 15.03 J/g, the Dynacoll S-1401 polymer used is situated at the lower target limit for the crystallite fusion enthalpy H(S) in the first heating curve after defined storage. Nevertheless, through appropriate overall formulation, it is possible to formulate a reactive PSA film having good push-out strength.

Comparative example V2 has no pressure-sensitive adhesive properties. By increasing the fraction of the reactive components (corresponding to a reduction in the polymer fraction in the overall formulation), a pressure-sensitive adhesive film of the invention can be obtained with a polymer which nevertheless meets the crystallization criteria of the invention (E11).

Examples E10 and E11 show that it is possible, using the methods of adaptive formulation familiar to the skilled person, to produce reactive PSA films of the invention within the formulation window set out in the present specification, using different polymeric film former matrices selected in accordance with the invention.

The last two tests set out in Table 1 E show the measurement of push-out values for a number of non-crystalline or inadequately crystalline matrix polymers which are therefore not inventive (fresh values) on the basis of examples V4 and V5.

On the basis of the fresh values for examples V3 and V4, it is apparent that the polymer selected there—Pearlbond 360, EXP, a hotmelt polyether-polyurethane with very low crystallite fusion enthalpy—does not produce good push-out strengths in the case of the fresh values with any of the reactive components selected. If, as in example V5, an amorphous polymer is used as the matrix polymer, the strengths are even lower. If the amorphous polymer from V4 is mixed with a polymer (E12) that meets the crystallization criteria of the invention, the push-out strength is increased to a range as desired for reactive pressure-sensitive adhesive tapes, but does not reach the same good strengths as with the pure polymer according to the invention (E1).

According to a first aspect of the present disclosure, a reactive pressure-sensitive adhesive film is provided. The reactive pressure-sensitive adhesive film includes: (a) a polymeric film former matrix; (b) one or more reactive components; and (c) a reagent selected from an initiator, a curing agent and an activator. The (b) one or more reactive components is present at a mass fraction of at least 30%, as based on the sum of (a), (b) and (c). Further, at least 50 wt % of the polymeric film former matrix is a crystallizable polymer which: (i) exhibits a crystallization enthalpy of less than 1 J/g in a differential scanning calorimetry (DSC) measurement, as measured on cooling at a rate of 10 K/min from a starting temperature which is at least 30 K above a peak temperature of the melting peak of the matrix and crystallizable polymer or at least 100° C., whichever starting temperature is greater; and (ii) exhibits a crystallite fusion enthalpy of at least 15 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

According to a second aspect, the first aspect is provided, wherein the initiator is a radical initiator.

According to a third aspect, the first aspect is provided, wherein the crystallizable polymer further exhibits a crystallization enthalpy of less than 35 J/g in a DSC measurement at a heating rate of 10 K/min from a starting temperature of −140° C.

According to a fourth aspect, the third aspect is provided, wherein the crystallization enthalpy is less than 10 J/g in the DSC measurement at a heating rate of 10 K/min from a starting temperature of −140° C.

According to a fifth aspect, the first aspect is provided, wherein the peak temperature of the melting peak of the crystallisable polymer is from 30° C. to 150° C.

According to a sixth aspect, the first aspect is provided, wherein the (b) one or more reactive components is present in a mass fraction of at least 35 wt %, as based on the sum of (a), (b) and (c).

According to a seventh aspect, the first aspect is provided, wherein the (b) one or more reactive components is present in a mass fraction of less than 70 wt %, as based on the sum of (a), (b) and (c).

According to an eighth aspect, the first aspect is provided, wherein the polymer film former matrix is a crystallizable polymer which exhibits a crystallite fusion enthalpy of not more than 50 mJ/mg in its pure state, as measuring in a first heating curve of a DSC measurement at a heating rate of 10 K/min and after storage for at least one month in a temperature range from 15 to 25° C. and at a relative humidity in the range from 30 to 70%.

According to a ninth aspect, the first aspect is provided, wherein the film is further configured such that a curing reaction of the film can be initiated in a temperature range from 15° C. to 30° C.

According to a tenth aspect of the present disclosure, a reactive pressure-sensitive adhesive film is provided. The reactive pressure-sensitive adhesive film includes: (a) a polymeric film former matrix; (b) one or more reactive components; and (c) a reagent selected from an initiator, a curing agent and an activator. The (b) one or more reactive components is present at a mass fraction of at least 30%, as based on the sum of (a), (b) and (c). Further, at least 50 wt % of the polymeric film former matrix is a crystallizable polymer that is a polyurethane which: (i) exhibits a crystallization enthalpy of less than 1 J/g in a differential scanning calorimetry (DSC) measurement, as measured on cooling at a rate of 10 K/min from a starting temperature which is at least 30 K above a peak temperature of the melting peak of the crystallizable polymer or at least 100° C., whichever starting temperature is greater; and (ii) exhibits a crystallite fusion enthalpy of at least 15 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

According to an eleventh aspect, the tenth aspect is provided, wherein the polyurethane comprises units derived from polyester diols.

According to a twelfth aspect, the tenth aspect is provided, wherein the (b) one or more reactive components comprise one or more of epoxide, hydroxyl, acrylate, methacrylate and isocyanate groups.

According to a thirteenth aspect, the tenth aspect is provided, wherein the initiator is a radical initiator.

According to a fourteenth aspect, the tenth aspect is provided, wherein the crystallizable polymer further exhibits a crystallization enthalpy of less than 35 J/g in a DSC measurement at a heating rate of 10 K/min from a starting temperature of −140° C.

According to a fifteenth aspect, the fourteenth aspect is provided, wherein the crystallization enthalpy is less than 10 J/g in the DSC measurement at a heating rate of 10 K/min from a starting temperature of −140° C.

According to sixteenth aspect, the tenth aspect is provided, wherein the peak temperature of the melting peak of the crystallizable polymer is from 30° C. to 150° C.

According to a seventeenth aspect, the tenth aspect is provided, wherein the (b) one or more reactive components is present in a mass fraction of at least 35 wt %, as based on the sum of (a), (b) and (c).

According to an eighteenth aspect, the tenth aspect is provided, wherein the (b) one or more reactive components is present in a mass fraction of less than 70 wt %, as based on the sum of (a), (b) and (c).

According to a nineteenth aspect, the first aspect is provided, wherein the polymer film former matrix is a crystallizable polymer which exhibits a crystallite fusion enthalpy of not more than 50 mJ/mg in its pure state, as measuring in a first heating curve of a DSC measurement at a heating rate of 10 K/min and after storage for at least one month in a temperature range from 15 to 25° C. and at a relative humidity in the range from 30 to 70%.

According to a twentieth aspect of the present disclosure, an adhesive film system is provided. The adhesive film system includes: at least two reactive pressure-sensitive adhesive films according to the first aspect and in contact with one another. The first pressure-sensitive adhesive film according to the first aspect is further configured such that the reagent is a radical initiator. Further, the second pressure-sensitive adhesive film according to the first aspect is further configured such that the reagent is an activator or an accelerator.

What is claimed is:
1. A reactive pressure-sensitive adhesive film, comprising:
   (a) a polymeric film former matrix;
   (b) one or more reactive components; and
   (c) a reagent selected from an initiator, a curing agent and an activator,
   wherein the (b) one or more reactive components is present at a mass fraction of at least 30%, as based on the sum of (a), (b) and (c), and
   further wherein at least 50 wt % of the polymeric film former matrix is a crystallizable polymer which:
   (i) exhibits a crystallization enthalpy of less than 1 J/g in a differential scanning calorimetry (DSC) measurement, as measured on cooling at a rate of 10 K/min from a starting temperature which is at least 30 K above a peak temperature of the melting peak of the crystallizable polymer or at least 100° C., whichever starting temperature is greater; and
   (ii) exhibits a crystallite fusion enthalpy of at least 15 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

2. The adhesive film according to claim 1, wherein the initiator is a radical initiator.

3. The adhesive film according to claim 1, wherein the crystallizable polymer further exhibits a crystallization enthalpy of less than 35 J/g in a DSC measurement at a heating rate of 10 K/min from a starting temperature of −140° C.

4. The adhesive film according to claim 3, wherein the crystallization enthalpy is less than 10 J/g in the DSC measurement at a heating rate of 10 K/min from a starting temperature of −140° C.

5. The adhesive film according to claim 1, wherein the peak temperature of the melting peak of the crystallizable polymer is from 30° C. to 150° C.

6. The adhesive film according to claim 1, wherein the (b) one or more reactive components is present in a mass fraction of at least 35 wt %, as based on the sum of (a), (b) and (c).

7. The adhesive film according to claim 1, wherein the (b) one or more reactive components is present in a mass fraction of less than 70 wt %, as based on the sum of (a), (b) and (c).

8. The adhesive film according to claim 1, wherein the crystallizable polymer exhibits a crystallite fusion enthalpy of not more than 50 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

9. The adhesive film according to claim 1, wherein the film is further configured such that a curing reaction of the film can be initiated in a temperature range from 15° C. to 30° C.

10. A reactive pressure-sensitive adhesive film, comprising:
   (a) a polymeric film former matrix;
   (b) one or more reactive components; and
   (c) a reagent selected from an initiator, a curing agent and an activator,
   wherein the (b) one or more reactive components is present at a mass fraction of at least 30%, as based on the sum of (a), (b) and (c), and
   further wherein at least 50 wt % of the polymeric film former matrix is a crystallizable polymer that is a polyurethane which:
   (i) exhibits a crystallization enthalpy of less than 1 J/g in a differential scanning calorimetry (DSC) measurement, as measured on cooling at a rate of 10 K/min from a starting temperature which is at least 30 K above a peak temperature of the melting peak of the crystallizable polymer or at least 100° C., whichever starting temperature is greater; and
   (ii) exhibits a crystallite fusion enthalpy of at least 15 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

11. The adhesive film according to claim 10, wherein the polyurethane comprises units derived from polyester diols.

12. The adhesive film according to claim 10, wherein the (b) one or more reactive components comprise one or more of epoxide, hydroxyl, acrylate, methacrylate and isocyanate groups.

13. The adhesive film according to claim 10, wherein the initiator is a radical initiator.

14. The adhesive film according to claim 10, wherein the crystallizable polymer further exhibits a crystallization enthalpy of less than 35 J/g in a DSC measurement at a heating rate of 10 K/min from a starting temperature of −140° C.

15. The adhesive film according to claim 14, wherein the crystallization enthalpy is less than 10 J/g in the DSC measurement at a heating rate of 10 K/min from a starting temperature of −140° C.

16. The adhesive film according to claim 10, wherein the peak temperature of the melting peak of the crystallizable polymer is from 30° C. to 150° C.

17. The adhesive film according to claim 10, wherein the (b) one or more reactive components is present in a mass fraction of at least 35 wt %, as based on the sum of (a), (b) and (c).

18. The adhesive film according to claim 10, wherein the (b) one or more reactive components is present in a mass fraction of less than 70 wt %, as based on the sum of (a), (b) and (c).

19. The adhesive film according to claim 10, wherein the crystallizable polymer exhibits a crystallite fusion enthalpy of not more than 50 mJ/mg in its pure state, as measured in a first heating curve of a DSC measurement at a heating rate of 10 K/min and after storage for at least one month in a temperature range from 15 to 25° C. and at a relative humidity in the range from 30 to 70%.

20. An adhesive film system, comprising:
at least two reactive pressure-sensitive adhesive films according to claim 1 and in contact with one another,
wherein the first pressure-sensitive adhesive film according to claim 1 is further configured such that the reagent is a radical initiator, and
further wherein the second pressure-sensitive adhesive film according to claim 1 is further configured such that the reagent is an activator or an accelerator.

* * * * *

UNITED STATES PATENT AND TRADEMARK OFFICE
CERTIFICATE OF CORRECTION

PATENT NO. : 11,926,769 B2
APPLICATION NO. : 17/362006
DATED : March 12, 2024
INVENTOR(S) : Keite-Telgenbüscher et al.

It is certified that error appears in the above-identified patent and that said Letters Patent is hereby corrected as shown below:

In the Specification

Column 3, Line 17:
Delete "matrix and"

Column 13, Line 12:
"fin" should be — f in —

Column 13, Line 37:
"1x5$^{-1}$" should be — 1xs$^{-1}$ —

Column 25, Line 40:
"Aerosile" should be — Aerosil® —

Column 32, Line 7:
Delete "matrix and"

Signed and Sealed this
Second Day of July, 2024

Katherine Kelly Vidal
*Director of the United States Patent and Trademark Office*